United States Patent [19]

Björkman et al.

[11] Patent Number: 5,528,358
[45] Date of Patent: Jun. 18, 1996

[54] OPTICAL ANGLE MEASURING DEVICE

[75] Inventors: Bengt Björkman, Järfalla; Georg Vogl, deceased, late of Saltsjöbaden, both of Sweden, by Johanna Hanka Vogl, executor

[73] Assignee: CelsiusTech Electronics AB, Jarfalla, Sweden

[21] Appl. No.: 82,932

[22] Filed: Jun. 29, 1993

[30] Foreign Application Priority Data

Jul. 2, 1992 [SE] Sweden .................................. 9202043

[51] Int. Cl.⁶ .............................. G01B 11/26; G01C 1/00
[52] U.S. Cl. .................................. 356/141.1; 250/206.2; 250/227.11; 250/203.1; 250/203.2; 356/141.2; 356/141.3
[58] Field of Search .............................. 250/206.1, 206.2, 250/227.11; 356/141.1, 141.5, 152.2, 141.2, 141.3, 203.1, 203.2, 203.3; 385/33

[56] References Cited

U.S. PATENT DOCUMENTS

| | | | |
|---|---|---|---|
| 2,403,387 | 12/1942 | McLennan . | |
| 3,819,940 | 6/1974 | Laws | 250/227 |
| 4,286,760 | 9/1981 | Couderc et al. | 244/3.16 |
| 4,433,912 | 2/1984 | Schwartz | 356/150 |
| 4,625,108 | 11/1986 | Nestel et al. | 250/227 |
| 4,711,578 | 12/1987 | Chaimowicz | 356/375 |
| 4,740,682 | 4/1988 | Frankel . | |
| 4,910,395 | 3/1990 | Frankel | 250/203.3 |
| 5,079,414 | 1/1992 | Martin . | |
| 5,114,227 | 5/1992 | Cleveland | 356/152 |
| 5,155,549 | 10/1992 | Dhadwal | 356/342 |
| 5,202,558 | 4/1993 | Barker | 356/28.5 |

FOREIGN PATENT DOCUMENTS 1472066  4/1977  United Kingdom .

Primary Examiner—Stephen C. Buczinski
Attorney, Agent, or Firm—Pollock, Vande Sande & Priddy

[57] ABSTRACT

An optical device for measuring the angular position of electromagnetic radiation, such as laser light, incident on the device, includes a lens system defining an input surface for receiving the incident electromagnetic radiation and an output surface towards which the incident radiation within the optical field of vision of the device is deflected by the lens system, a plurality of light guides each having a first end facing and in direct physical and optical contact with the output surface of the lens system, the first ends of the light guides substantially covering the output surface of the lens system, a detector allocated to each respective light guide and connected to its second end, and a calculating unit for determining a present angular position, based on the signal values outputted by the detectors, by calculating ratio between difference signals and sum signals of signal values of the detectors and determining the angular position corresponding to this ratio.

12 Claims, 2 Drawing Sheets

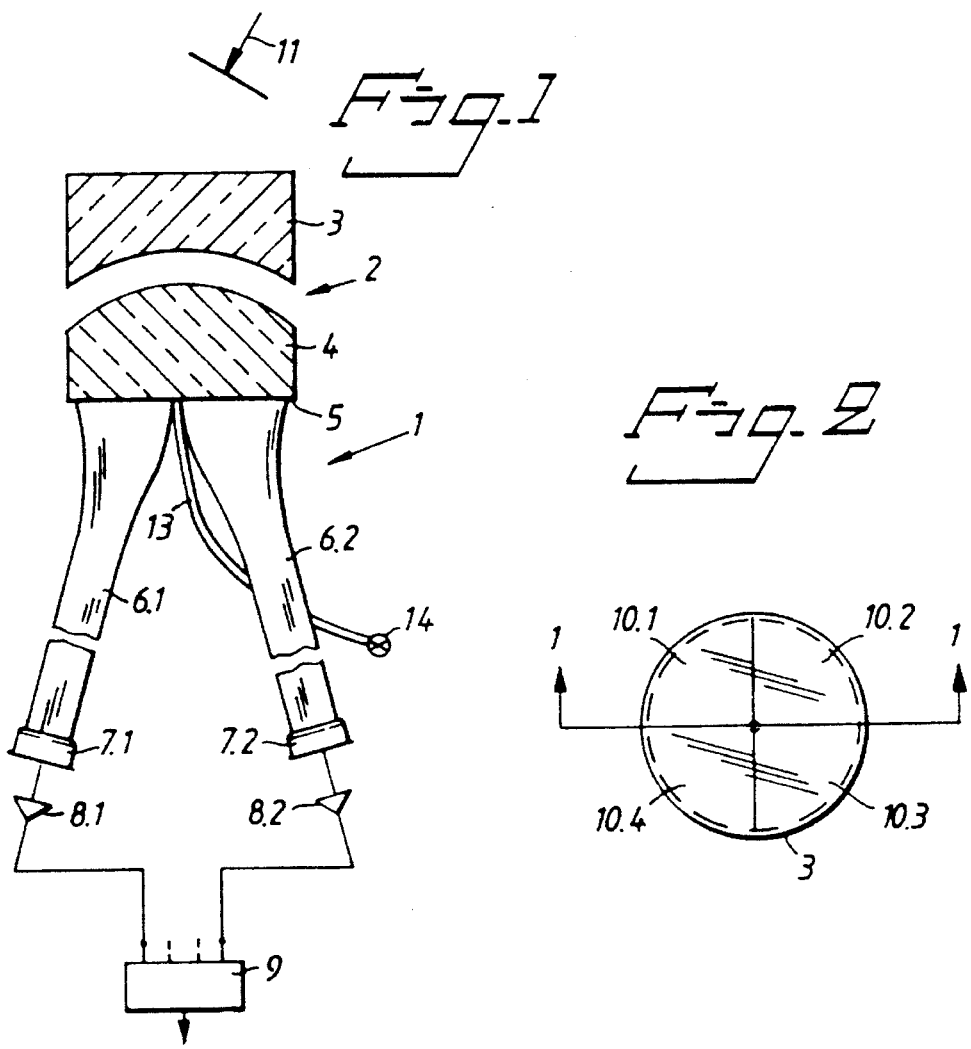
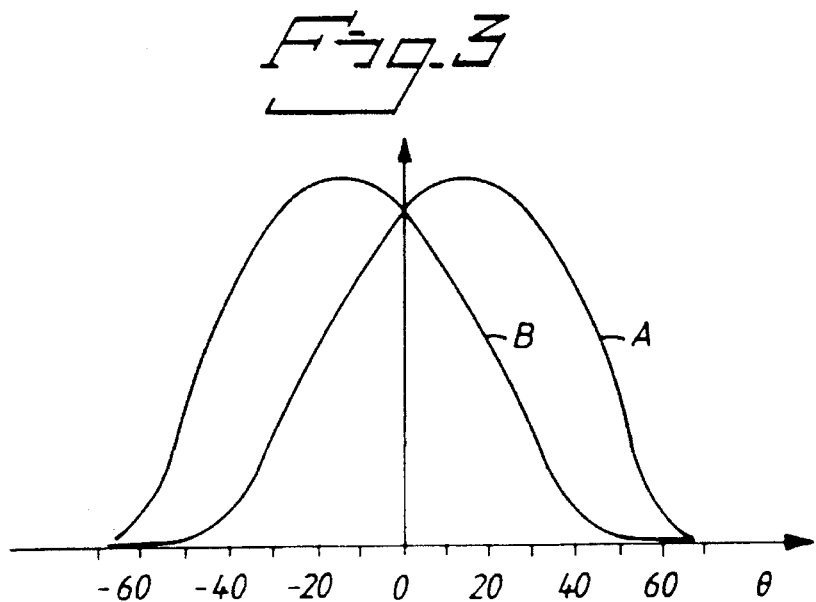

OPTICAL ANGLE MEASURING DEVICE

FIELD OF THE INVENTION

The present invention relates to an optical angle measuring device for measuring the angular position of electromagnetic radiation, such as laser light, incident on the angle measuring device.

SUMMARY OF THE INVENTION

The object of the present invention is to provide an optical angle measuring device which does not have any moving parts and can be made very compact with little active surface for radiation incident on the angle measuring device, which makes the angle measuring device very easy to positions capable of absorbing shocks and relatively insensitive to so-called speckle. It is therefore quite suitable for use in, among other things, defence equipment and the angular position of incident radiation can be determined with very high accuracy on the basis of the instantaneous values of the incident radiation.

The object of the invention is achieved by an optical angle measuring device which comprises means for dividing the incident radiation into at least two radiation parts, a detector allocated to each respective radiation part and outputting an electrical signal representing signal strength detected by the detector, and means for calculating the angular position on the basis of the signal strengths offered by the detectors, by calculating ratios between difference signals and sum signals of signal strengths of the detectors, which ratios correspond to predetermined angular positions. Expressed more simply, it can be said that an imbalance in strength between the radiation parts is utilized for calculating the angular position.

According to an advantageous embodiment, the means for dividing the incident radiation comprises a lens arrangement and a number of optical fibers corresponding to the number of radiation parts, one end of each optical fiber being connected to the lens arrangement while the other end is connected to the detector allocated to the radiation part. The combination consisting of a lens arrangement and optical fiber is completely free of moving parts and can have a compact form.

In a certain compact embodiment, the lens arrangement can be constructed of only one plane-convex lens, the plane surface being turned towards one end of the optical fibres and the convex surface being turned towards the input opening of the angle measuring device.

To increase the field of view of the angle measuring device, a negative lens can be included closest to the input opening of the angle measuring device in accordance with an advantageous embodiment. An example of a suitable negative lens is a plane-concave lens, the plane surface of which is turned towards the input opening of the angle measuring device.

The lens arrangement can advantageously be constructed of a compact body divided into lenses with different indexes of refraction. This prevents moisture from penetrating and a film being formed between the lenses.

To prevent stray light from reducing the applicable angle range, the edge surfaces of the lens arrangement can be blackened at least partially according to a further advantageous embodiment.

The operation of the angle measuring device can be tested by introducing a further optical fiber. One end of the optical fiber is connected to the lens arrangement while the other end is connected to a light source. The light which is transported to the lens arrangement through the further optical fiber is fed back at least in part to detectors included in the angle measuring device in accordance with a known characteristic in one test. On connecting the further part to the center of the lens arrangement, essentially equally large signals at the different detectors can indicate a faultless operation of the angle measuring device.

According to a suitable embodiment, the means for dividing the incident radiation are arranged to divide the incident radiation into four beam parts. The angular position can be easily determined thereby in two directions at right angles to one another.

The invention will be described in greater detail below, with reference to attached drawings in which:

BRIEF DESCRIPTION OF THE DRAWINGS

FIG. 1 diagrammatically shows an angle measuring device according to the invention in partial section according to line 1—1 in FIG. 2;

FIG. 2 shows a diagrammatic top view of the angle measuring device according to the invention;

FIGS. 3 and 4 show curve diagrams of detected signals and clarify the calculation of the angular position;

DETAILED DESCRIPTION OF THE PREFERRED EMBODIMENT(S)

Figure 4:
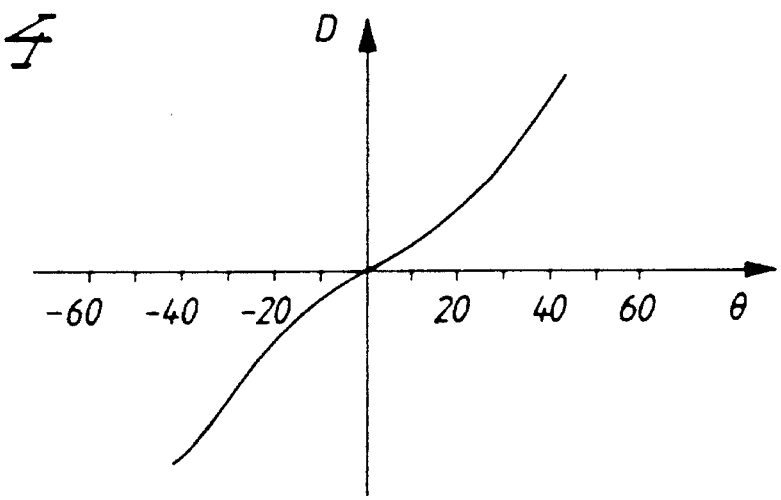

The optical angle measuring device 1 diagrammatically shown in FIG. 1 comprises a lens arrangement 2 including a plane-concave lens 3 and a plane-convex lens 4 in this order counting from the input opening of the angle measuring device. One end of four separate optical fibers 6.1–6.4 is connected to the plane surface 5 of the plane-convex lens 4, only the two rear optical fibers 6.1 and 6.2 of which are shown in FIG. 1. At the other end of the optical fibers, optical detectors 7.1 and 7.2 are arranged. The output of each detector 7.1, 7.2 is connected to an associated amplifier 8.1, 8.2. The detectors are connected via the amplifiers to an electronic calculating circuit 9.

FIG. 2 shows the connection of the optical fibers 6.1–6.4 to the plane-convex lens 4. According to the figure each optical fiber falls up a circle sector of 90° 10.1–10.4. In the direction of the detectors, the optical fibers are arranged to change from the circle sector-shaped section to a circular section.

As can be seen from FIGS. 1 and 2 a further optical fiber 13 is connected between the center of the plane surface 5 of the plane-convex lens 4 and a light source 14. The optical fiber 13 and light source 14 are included in a test operation which will be described further below.

Radiation 11, in the form of, for example, monopulses, incident on the angle measuring device 1 within the field of view of the angle measuring device is refracted via the lens arrangement 2 towards the circle-sector shaped end faces of the optical fibers connected to the plane-convex lens 4. In the case where the incident radiation is incident at right angles on the plane surface 12 of the plane-concave lens, the radiation is ideally distributed equally between the four incoming optical fibers 6.1–6.4 and their associated detectors 7.1–7.4. When the incident radiation deviates from the right-angle direction an imbalance is created in the detected signal strengths. The imbalance created contains information about the angular position relative to the right-angle direction of incidence and can be utilized for determining the angular position in a way which is described in greater detail below.

The curve diagram in FIG. 3 shows an example of how the signals output by the detectors can appear as a function of an angle deviation θ from the normal at the input opening in the case where only two symmetrically arranged optical fibers are included in the angle measuring device. In the example shown, one signal A has a top value at an angle deviation of approximately 15° while the second signal B has a top value at an angle deviation of approximately −15°.

In the curve diagram in FIG. 4, the signal ratio $D=(A-B)/(A+B)$ is plotted as a function of the angle deviation θ. By calculating the signal ratio D and checking the angular position to which this corresponds, a current angular position can be determined. Angular positions of signal ratios which can occur are suitably plotted in advance in table form. The vertical and horizontal angular position can be calculated by interpolation.

The determination of the angular position has been illustrated above for two optical fibers with associated detectors. However, there is nothing to prevent the number from being increased to four or perhaps more. In the case of four detectors, which are provided by the embodiment according to FIGS. 1 and 2, the determination of the angular position can be carried out in a first direction by the signals from two first pairs of adjacent detectors being summed before the calculation of the ratio, for example the sum of the signals from detectors 7.1 and 7.2 and the sum of the signals from detectors 7.3 and 7.4. In a direction at right angles with respect to the first direction, the angular position can thereby be determined by summing the signals of the detectors 7.1 and 7.4 and summing the signals of detectors 7.2 and 7.3 before calculating the ratio.

Testing of the operation of the angular measuring device takes place in such a manner that the light source 14 placed at one of the ends of the optical fiber 13 is activated. The light source can be formed by, for example, a diode laser. The light is conducted from the light source 14 via the optical fiber 13 to the plane part 5 of the plane-convex lens 4. At least one part of the light conducted to the plane-convex lens is reflected towards the optical fibers 6.1–6.4. Since it is a question of a completely symmetrical arrangement of optical fibers in this case, the light reflected towards the optical fibers 6.1–6.4 is distributed essentially constant between the optical fibers and their associated detectors. The electronic circuit 9 indicates an operating angle measuring device in the case where the detectors output signals of essentially the same magnitude. A malfunction is indicated in the other case.

Figure 5:
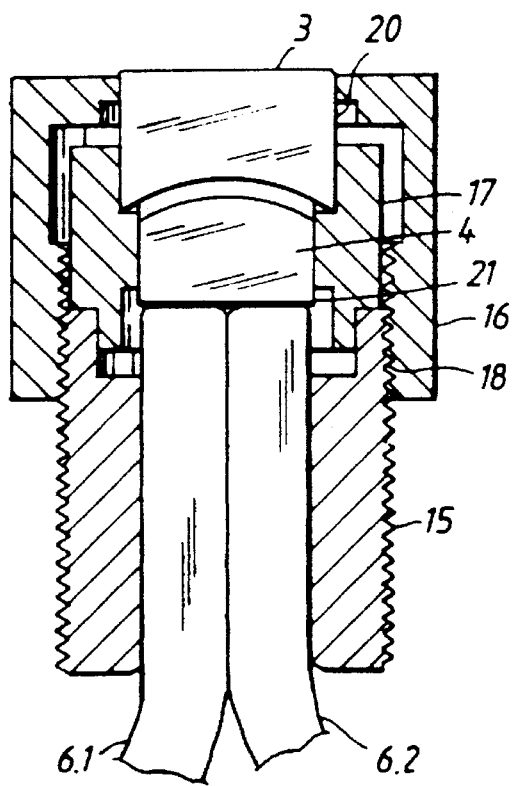
FIG. 5 shows in a partial section an example of how the means for dividing the incident radiation can be included at the input opening of the angle measuring device.

FIG. 5 shows a partial section of an example of how the means for dividing the incident radiation can be included at the input opening of the angle measuring device. The lens arrangement 2 and the optical fibers 6.1–6.4 are included in circular essentially tubular elements 15, 16, 17. The plane-concave lens 3 is kept in place by the interaction between the tubular elements 16, 17. The plane-convex lens 4 can be fixed on the inside of the tubular element 17 by gluing. The tubular elements 15, 16 are combined by a screw connection 18. The optical fibers 6.1–6.4 can be glued with their ends to the plane surface 5 of the plane-convex lens 4 according to this embodiment. The transition between the optical fibers and the plane surface can possibly be filled with a refractive-index-adapted oil, that is to say an oil with a refractive index which squared corresponds to the product of the refractive index of the plane-convex lens and the refractive index of the optical fibers. A suitable choice of material for the lenses included can be sapphire for the plane-concave lens 3 and crown glass for the plane-convex lens 4.

Stray light in the angle measuring device reduces its applicable angular range. To reduce the stray light, the edge surfaces 20, 21 of the lens arrangement can be wholly or partially blackened according to a first method. If the refractive index of the blackening means closely corresponds to the associated lens, the light is incident at the blackening means almost without reflection losses. By the blackening means containing attenuating means such as carbon grains the light is almost completely attenuated before it again approaches the lens. According to a second method, the lenses can be provided with preferably circular baffles which surround the edge surfaces of the lenses.

Figure 6:
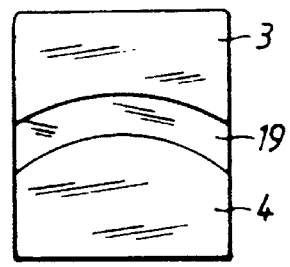
FIG. 6 shows a further example of a lens arrangement which can be included in the angle measuring device.

FIG. 6 shows a lens arrangement 2 in the form of a compact body comprising three lens parts. In addition to the lens parts described in accordance with the above, in the form of a plane-concave and a plane-convex lens 3 and 4, respectively, an intermediate lens 19 is present which fills out the space between the lenses 3 and 4. The arrangement prevents moisture from penetrating into the lens arrangement and ćausing formation of a film.

The invention is not in any way limited to the embodiments described but a large number of variants are accommodated within the scope of the invention as defined by the patent claims. For example, the number of optical fibers with associated detectors, and thereby the form taken by the ends of the optical fibers on connection to the plane-convex lens can be varied within wide limits.

It is claimed:

1. An optical device for measuring the angular position of electromagnetic radiation, such as laser light, incident on the device, the device comprising:

a lens system defining an input surface for receiving said incident electromagnetic radiation and an output surface towards which the incident radiation within the optical field of vision of the device is deflected by the lens system, a plurality of light guides each having a first end facing and in direct physical and optical contact with the output surface of the lens system, the first ends of the light guides substantially covering the output surface of the lens system, a detector allocated to each respective light guide and connected to the second end of a respective light guide, and a calculating unit for determining a present angular position, based on the signal values outputted by the detectors, said calculating unit calculating ratios between difference signals and sum signals of signal values from the detectors and determining the angular position corresponding to said ratios.

2. An optical device according to claim 1, wherein the lens system is constructed as a compact body divided into lenses having different refractive indexes.

3. An optical device according to claim 2, wherein the edge surfaces of the lens system are at least partially blackened.

4. An optical device according to claim 1, wherein the edge surfaces of the lens system are at least partially blackened.

5. An optical device according to claim 1, wherein for testing of the optical device a further optical device is connected in direct physical and optical contact with the lens system and preferably at the center through its one end while the other end of the further optical device is connected to a light source.

6. Optical device according to claim 1, wherein the correspondence of the ratios to angular positions is stored tabulated.

7. An optical device for measuring the angular position of electromagnetic radiation, such as laser light, incident on the device, the device comprising:

a lens system defining an input surface for receiving said incident electromagnetic radiation and an output surface towards which the incident radiation within the optical field of vision of the device is deflected by the lens system, a plurality of light guides each having a first end facing and in direct physical and optical contact with the output surface of the lens system, the first ends of the light guides substantially covering the output surface of the lens system, a detector allocated to each respective light guide and connected to the second end of a respective light guide, and a calculating unit for determining a present angular position, based on the signal values outputted by the detectors, said calculating unit calculating ratios between difference signals and sum signals of signal values of the detectors and determining the angular position corresponding to said ratios, wherein the lens system comprises a plano-convex lens, the plane surface of which constitutes the output surface of the lens system.

8. An optical device according to claim 7, wherein the lens system is constructed as a compact body divided into lenses having different refractive indexes.

9. An optical device according to claim 7, wherein the edge surfaces of the lens system are at least partially blackened.

10. An optical device according to claim 7, wherein for testing of the optical device a further optical device is connected in direct physical and optical contact with the lens system, preferably at the center through its one end while the other end of the further optical device is connected to a light source.

11. Optical device according to claim 7, wherein the correspondence of the ratios to angular positions is stored tabulated.

12. An optical device according to claim 7 further comprising a negative lens for increasing the field of view, one surface of which constitutes the input surface of the lens system and the other surface of which is turned towards the convex surface of the plano-convex lens.

* * * * *